(12) United States Patent
Güntert et al.

(10) Patent No.: US 6,322,838 B1
(45) Date of Patent: Nov. 27, 2001

(54) MINT AND/OR FRUIT FLAVOR COMPOSITIONS

(75) Inventors: Matthias Güntert, Ridgewood, NJ (US); Günter Kindel, Höxter (DE); Volkmar Koppe, Holzminden (DE); Stefan Lambrecht, Holzminden (DE); Horst Surburg, Holzminden (DE)

(73) Assignee: Haarmann & Reimer GmbH, Holzminden (DE)

( * ) Notice: Subject to any disclaimer, the term of this patent is extended or adjusted under 35 U.S.C. 154(b) by 0 days.

(21) Appl. No.: 09/558,283

(22) Filed: Apr. 25, 2000

(51) Int. Cl.$^7$ .................................................... A23L 1/22
(52) U.S. Cl. ............................. 426/534; 426/3; 424/49; 424/54; 560/205; 560/261
(58) Field of Search ................ 424/49, 54; 426/3, 426/534; 560/205, 261

(56) References Cited

U.S. PATENT DOCUMENTS

| | | | | |
|---|---|---|---|---|
| 4,510,319 | * | 4/1985 | Willis et al. ........................ | 560/231 |
| 5,756,821 | * | 5/1998 | Dilk et al. ........................ | 560/129 |
| 6,034,268 | * | 3/2000 | Surburg et al. .................... | 560/261 |

* cited by examiner

Primary Examiner—James H. Reamer
(74) Attorney, Agent, or Firm—Joseph C. Gil; Noland J. Cheung

(57) ABSTRACT

A flavor composition comprising 8-ocimenyl esters of the formula

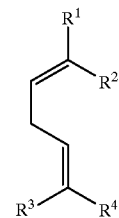

wherein one of the two radicals $R^1$ and $R^2$ is methyl and the other is vinyl and one of the two radicals $R^3$ and $R^4$ is methyl and the other is

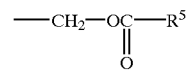

wherein $R^5$ is hydrogen, alkyl or alkenyl. Such flavor composition can also be mint and/or fruit flavor compositions, wherein the 8-ocimenyl esters have a flavor-enhancing action.

27 Claims, No Drawings

MINT AND/OR FRUIT FLAVOR COMPOSITIONS

FIELD OF THE INVENTION

The invention relates to mint and/or fruit flavor compositions which comprise 8-ocimenyl esters and to their use in foods, tobacco products or for oral hygiene.

BACKGROUND OF THE INVENTION

In the fragrance and flavor industry, there is a great need for substances, which can be used in fragrance and flavor compositions to partially or completely replace natural substances, which, because of the laborious nature of their manufacture, are expensive. Additionally, such natural substances are available only in limited amounts and, moreover, their properties are subject to considerable quality fluctuations, which arise because they are natural substances.

Of particular interest, then, are substances, which not only have excellent organoleptic properties (i.e., properties perceptible only by the senses), but, because of their strength and richness, can be used to achieve notable effects even at extremely low concentrations.

However, in the flavorings and food industry, substances which, apart from the property of imparting a certain odor or taste, have additional properties which are increasingly important. These can, for example, be certain stimuli, which are transmitted over the trigeminal nerve and thus perceived. They can, however, also be effects, which reduce or enhance olfactory and gustatory sensations.

SUMMARY OF THE INVENTION

We have found mint and/or fruit flavor compositions, which comprise 8-ocimenyl esters of the formula

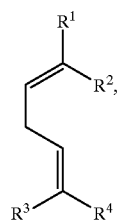

(I)

wherein
one of the two radicals $R^1$ and $R^2$ is methyl and the other is vinyl and
one of the two radicals $R^3$ and $R^4$ is methyl and the other is

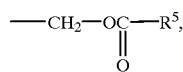

wherein
$R^5$ is hydrogen, alkyl or alkenyl, in particular $C_1$–$C_6$-alkyl or $C_2$–$C_6$-alkenyl.

DETAILED DESCRIPTION OF THE INVENTION

Preference is given to mint and/or fruit flavor compositions, which comprise 8-ocimenyl esters of the formula

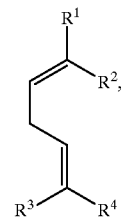

(I)

wherein
one of the two radicals $R^1$ and $R^2$ is methyl and the other is vinyl and
one of the radicals $R^3$ and $R^4$ is methyl and the other is

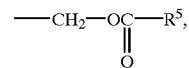

wherein
$R^5$ is hydrogen, methyl, ethyl, n-propyl, isopropyl, n-butyl, sec-butyl, isobutyl, tert-butyl or 2-butenyl.

Particular preference is given to mint and/or fruit flavor compositions, which comprise 8-ocimenyl esters of the formula:

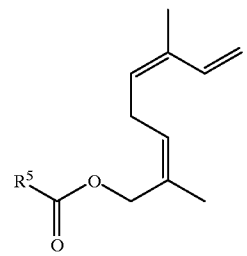

(Ia)

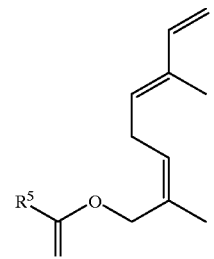

(Ib)

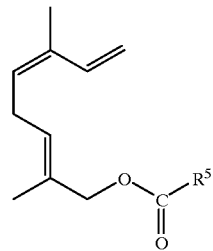

(Ic)

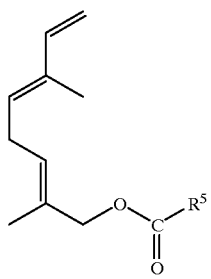

(Id)

in which

R⁵ is hydrogen, methyl or ethyl.

Surprisingly, the 8-ocimenyl esters enhance the olfactory and gustatory sensation in mint and/or fruit flavor compositions.

8-Ocimenyl esters for the mint and/or fruit flavor compositions according to the present invention can be prepared by reacting 6-ocimenyl chloride of the formula

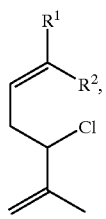

(II)

wherein $R^1$ and $R^2$ are as defined above, with a salt, in particular an alkaline salt, such as Na or K salt, of an aliphatic carboxylic acid, in particular a $C_2$–$C_7$-carboxylic acid.

The process is preferably carried out in an organic solvent, in particular in a dipolaraprotic solvent. Examples of such solvents are dimethylformamide, dimethyl sulphoxide, N-methylpyrrolidone, diethylene glycol dimethyl ether and mixtures thereof. The reaction is preferably carried out at a temperature from 50 to 150° C., more preferably from 90 to 120° C., optionally under pressure.

The process, starting from the compounds of the formula (II), is preferably carried out in the presence of an alkali metal iodide or elemental iodine, more preferably in the presence of NaI, this addition preferably being used in catalytic amounts, preferably in an amount of from 0.01 to 10% by weight, based on II.

In the process, the compound of the formula (II) can be used as the E- or Z-isomer or as any E/Z mixture.

If the E/Z mixture of the formula (II) is used, i.e. a mixture of a compound (II) in which $R^1$ is methyl and $R^2$ is vinyl, and a compound (II) in which $R^1$ is vinyl and $R^2$ is methyl, then a mixture containing the compounds of the formulae (Ia)–(Id) is obtained.

Particular preference is given to the process using sodium acetate as salt of an aliphatic carboxylic acid.

6-Ocimenyl chlorides can, for example, be prepared by reacting ocimene of the formula

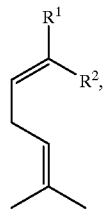

(III)

wherein $R^1$ and $R^2$ are as defined above, with hypochlorous acid or sulfuryl chloride ($SO_2Cl_2$).

For the reactions with hypochlorous acid, the latter is usually generated in situ from salts of hypochlorous acid by acidification. For the preparation of 6-ocimenyl chloride(II), it has proven advantageous to liberate hypochlorous acid from sodium hypochlorite solution by acidification with acetic acid. The reaction with ocimene then proceeds in a two-phase system; the presence of a solvent is not necessary. The reaction temperature can be between 0 and 50° C.; a temperature range from 10 to 20° C. is preferable.

The chlorination is carried out using sulfuryl chloride, preferably in the presence of a base, more preferably in the presence of an alkali metal carbonate, such as sodium or potassium carbonate, which is used, in particular, in excess, based on sulfuryl chloride. Possible solvents are compounds, which are inert towards sulfuryl chloride, such as hydrocarbons, preferably n-hexane or n-heptane, such as halogenated hydrocarbons, preferably dichloromethane or tetrachloromethane, or such as ethers, preferably methyl tert-butyl ether. The reaction temperature is, in particular, from 0 to 50° C., a range from 20 to 30° C. being preferable.

The ocimene can be used here as cis-ocimene, as trans-ocimene or as a cis/trans mixture.

Preference is given to using a cis/trans ocimene mixture, a content of from 50 to 90% by weight of trans-isomer and from 50 to 10% by weight of cis-isomer being preferable, from which a E/Z mixture of the compound of the 6-ocimenyl chlorides (II) can be prepared and therefrom, in turn, a mixture of isomeric 8-ocimenyl esters of the formulae (Ia)–(Id).

Mint Compositions According to the Present Invention Comprise Mint Flavor Components and 8-ocimenyl Esters Mint flavor components can, for example, be:

essential oils, such as, for example, peppermint oil, spearmint oil, mentha-arvensis oil, clove oil, citrus oils, cinnamon bark oil, wintergreen oil, cassia oil, davana oil, spruce needle oil, eucalyptus oil, fennel oil, galbanum oil, ginger oil, camomile oils, caraway oil, rose oil, geranium oil, sage oils, yarrow oil, anise seed oil, thyme oil, juniper berry oil, angelica root oil, and the fractions of these oils.

Individual flavor substances (in the case of chiral compounds as racemate or as individual enantiomer or as enantiomer-enriched mixture) such as, for example, menthol, menthone, isomenthone, menthyl acetate, menthofuran, mint lactone, eucalyptol, limonene, eugenol, pinene, sabinene hydrate, 3-octanol, carvone, gamma-octalactone, gamma-nonalactone, germacren-D, viridiflorol, 1,3E,5Z-undecatriene, isopulegol, piperitone, 3-octyl acetate, isoamyl isovalerate, hexanol, hexanal, cis-3-hexenol, linalool, alpha-terpineol, cis and trans carvyl acetate, p-cymene, damascenone, damascone, dimethyl sulfide, fenchol, cis-4-heptenal, isobutyraldehyde, isovaleraldehyde, cis-jasmone, anisaldehyde, methyl salicylate, myrtenyl acetate, 2-phenyl ethyl alcohol, 2-phenylethyl isobutyrate, 2-phenylethyl isovalerate, cinnamaldehyde, geraniol, nerol.

Compounds having a physiological cooling effect such as for example menthol, menthoneglycerol acetal, menthyl lactate, substituted menthyl-3-carboxamides (e.g. menthyl-3-carboxylic acid N-ethylamide), 2-isopropyl-N,2,3-trimethylbutanamide, substituted cyclohexanecarboxylic acid amides, 3-menthoxypropane-1,2-diol, 2-hydroxyethylmenthyl carbonate, 2-hydroxypropylmenthyl carbonate, N-acetylglycine menthyl ester, menthylhydroxycarboxylic acid ester (e.g. menthyl-3-hydroxybutyrate), menthylsuccinic acid ester, 2-mercaptocyclodecanone and 2-isopropyl-5-methylcyclohexyl-5-oxo-2-pyrrolidinecarboxylic acid.

Sweeteners, such as for example aspartame, saccharin, Acesulfam-K®, sorbite; xylite, cyclamates (such as for example sodium cyclamate), Sucralose®, Alitam®, Neotam ®, Thaumatin®, Neohesperidine DC®, maltitol and lactitol.

Preferred mint flavor components are:
essential oils such as, for example, peppermint oil, spearmint oil, mentha-arvensis oil, clove oils, citrus oils, wintergreen oil, cassia oil, davana oil, spruce needle oil, eucalyptus oil, fennel oil, galbanum oil, ginger oil, camomile oil, caraway oil, geranium oil, sage oils, yarrow oil, anise seed oils, thyme oil, juniper berry oil, angelica root oil, and the fractions of these oils.

Individual flavor substances (in the case of chiral compounds as racemate or as individual enantiomer or as enantiomer-enriched mixture) such as, for example, menthol, menthone, isomenthone, menthyl acetate, menthofuran, mint lactone, eucalyptol, limonene, eugenol, pinene, sabinene hydrate, 3-octanol, carvone, isopulegol, piperitone, 3-octyl acetate, hexanol, hexanal, cis-3-hexenol, linalool, alpha-terpineol, cis and trans carvyl acetate, p-cymene, dimethyl sulfide, cis-4-heptenal, isobutyraldehyde, isovaleraldehyde, cis-jasmone, anisaldehyde, methyl salicylate, 2-phenyl ethyl alcohol, 2-phenylethyl isobutyrate, 2-phenylethyl isovalerate, cinnamaldehyde, geraniol, nerol.

Compounds having a physiological cooling effect such as for example menthol, menthoneglycerol acetal, menthyl lactate, menthyl-3-carboxylic acid N-ethylamide, 2-isopropyl-N,2,3-trimethylbutanamide, 3-menthoxypropane-1,2-diol, 2-hydroxyethylmenthyl carbonate, 2-hydroxypropylmenthyl carbonate, N-acetylglycine menthyl ester, menthyl-3-hydroxybutyrate, menthylsuccinic acid ester and 2-isopropyl-5-methylcyclohexyl-5-oxo-2-pyrrolidinecarboxylic acid.

Sweeteners such as for example aspartame, saccharin, Acesulfam-K®, sorbite; xylite, cyclamates (e.g. sodium cyclamate), Sucralose® and Alitam ®.

Particular preference is given to the following mint flavor components:
essential oils such as, for example, peppermint oil, spearmint oil, mentha-arvensis oil, wintergreen oil, and the fractions of these oils.

Individual flavor substances (in the case of chiral compounds as racemate or as individual enantiomer or as enantiomer-enriched mixture) such as, for example, menthol, menthone, isomenthone, menthyl acetate, menthofuran, mint lactone, eucalyptol, limonene, sabinene hydrate, carvone, isopulegol, piperitone, 3-octyl acetate, hexanol, hexanal, cis-3-hexenol, linalool, alpha-terpineol, cis and trans carvyl acetate, p-cymene, dimethyl sulfide, cis-4-heptenal, isobutyraldehyde, isovaleraldehyde, cis-jasmone, anisaldehyde, methyl salicylate, 2-phenyl ethyl alcohol, cinnamaldehyde.

Compounds having a physiological cooling effect such as for example menthol, menthone glycerol acetal, menthyl lactate, menthyl-3-carboxylic acid N-ethylamide, 3-menthoxypropane-1,2-diol, 2-hydroxyethylmenthyl carbonate, 2-hydroxypropylmenthyl carbonate and 2-isopropyl-5-methylcyclohexyl 5-oxo-2-pyrrolidinecarboxylic acid.

Sweeteners such as for example aspartame, saccharin, Acesulfam-K®, sorbite; xylite, cyclamates (such as for example sodium cyclamate), Sucralose®, Alitam® and Neotam®.

Fruit flavor compositions according to the present invention comprise fruit flavor components and 8-ocimenyl esters. Fruit flavor components can, for example, be:
essential oils such as, for example, citrus oils, buchu leaf oil, davana oil, cassia oil, cedarwood oils, geranium oil, grain fusel oils, lemongrass oil, ambrette seed oil, rose oil, cinnamon bark oil, clove oils, carrot seed oil, mace oil, massoi bark oil, sandalwood oil, and fractions thereof.
Extracts such as, for example, fruit juice concentrates from all common fruits, guarana extracts, elderflower extracts, iris absolute, broom absolute, jasmine absolute, liquorice extract, osmanthus absolute, iris root extract, vanilla extract, chicory extracts, cinnamon extracts, boronia absolute.
Distillates from All Common Fruits Individual flavor substances (in the case of chiral compounds as racemate or as individual enantiomer or as enantiomer-enriched mixture) such as, for example, all common saturated and unsaturated fruit esters from the lower aliphatic acids $C_1$–$C_{12}$ and the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta-ionone, raspberry ketone, 2,5-dimethyl-4-hydroxy-3(2H)-furanone, limonene, linalool, linalool oxide, phenylacetaldehyde, phenylacetic acid, 2-phenylethanol, maltol, vanillin, eugenol, 2-methyl-4-propyl-1,3-oxathiane, 3-methylthiohexanol, 4-methyl-4-mercapto-2-pentanone, methyleugenol, anethole, anise alcohol, anisaldehyde, guaiacol, cinnamyl alcohol, cinnamaldehyde, citral, citronellal, citronellol, nerol, geraniol, ethylvanillin, benzyl alcohol, all common cinnamyl esters, all common benzyl esters, damascone, diacetyl, diethyl malonate, dihydrocoumarin, beta-7,8-dihydroionone, dimethyl anthranilate, methyl anthranilate, 2(5)-ethyl-5(2)-methyl-4-hydroxy-3(2H)-furanone, ethylmaltol, eucalyptol, farnesal, farnesol, heliotropin, all common cis-3-hexenyl esters, alpha-iron, menthol, menthyl acetate, ethyl decadienoate, methyl dihydrojasmonate, methyl cinnamate, ethyl cinnamate, methyl salicylate, lactic acid, myrcene, neryl acetate, geranyl acetate, nootkatone, 2,3-pentanedione, all common 2-alkanones, 3-thiohexanol, 8-thiomenthan-3-one, rose oxide, 4-ketoisophorone.

Preferred fruit flavor components are:
essential oils, for example, citrus oils, buchu leaf oil, davana oil, cassia oil, cedarwood oil, lemongrass oil, rose oil, cinnamon bark oil, clove oils, carrot seed oil, mace oil, massoi bark oil, sandalwood oil, and fractions thereof.
Extracts such as, for example, fruit juice concentrates from all common fruits. Distillates from all common fruits.

Individual flavor substances (in the case of chiral compounds as racemate or as individual enantiomer or as enantiomer-enriched mixture) such as, for example, all common saturated and unsaturated fruit esters from the lower aliphatic acids $C_1$–$C_{12}$ and the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta-ionone, raspberry ketone, 2,5-dimethyl-4-hydroxy-3(2H)-furanone, limonene, linalool, linalool oxide, phenylacetaldehyde, phenylacetic acid, 2-phenylethanol, maltol, vanillin, eugenol, 2-methyl-4-propyl-1,3-oxathiane, 3-methylthiohexanol, 4-methyl-4-mercapto-2-pentanone, methyleugenol, anethol, anise alcohol, anisaldehyde, guajakol, cinnamyl alcohol, cinnamaldehyde, citral, citronellal, citronellol, nerol, geraniol, ethylvanillin, benzyl alcohol, all common cinnamyl esters, all common benzyl esters, damascone, diacetyl, diethyl malonate, dihydrocoumarin, beta-dihydroionone, dimethyl anthranilate, methyl anthranilate, 2(5)-ethyl-5(2)-methyl-4-hydroxy-3(2H)-furanone, ethylmaltol, heliotropin, all common cis-3-hexenyl esters, alpha-iron, ethyl decadienoate, methyl dihydrojasmonate, methyl cinnamate, ethyl cinnamate, methyl salicylate, nootkatone, 8-thiomenthanone-3, rose oxide, ketoisophorone.

Particular preference is given to the following fruit flavor components:

essential oils such as, for example, citrus oils, buchu leaf oil, cassia oil, cedarwood oil, lemongrass oil, carrot seed oil, mace oil, massoi bark oil, sandalwood oil, and fractions thereof.

Extracts such as, for example, fruit juice concentrates from all common fruits.

Distillates from All Common Fruits

Individual flavor substances (in the case of chiral compounds as racemate or as individual enantiomer or as enantiomer-enriched mixture) such as, for example, all common saturated and unsaturated fruit esters from the lower aliphatic acids $C_1$–$C_{12}$ and the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta-ionone, raspberry ketone, 2,5-dimethyl-4-hydroxy-3(2H)-furanone, limonene, linalool, phenylacetaldehyde, 2-phenylethanol, maltol, vanillin, eugenol, 2-methyl-4-propyl-1,3-oxathiane, 3-methylthiohexanol, 4-methyl-4-mercapto-2-pentanone, anethol, anise alcohol, anisaldehyde, guajakol, cinnamyl alcohol, cinnamaldehyde, citral, citronellal, citronellol, nerol, geraniol, ethylvanillin, benzyl alcohol, anisaldehyde, all common cinnamyl esters, all common benzyl esters, damascone, diacetyl, dihydrocoumarin, beta-dihydroionone, dimethyl anthranilate, methyl anthranilate, 2(5)-ethyl-5(2)-methyl-4-hydroxy-3(2H)-furanone, ethylmaltol, heliotropin, all common cis-3-hexenyl esters, alpha-iron, ethyl decadienoate, methyl dihydrojasmonate, methyl cinnamate, ethyl cinnamate, nootkatone, 8-thiomenthanone-3, rose oxide, and ketoisophorone.

It is also possible to use mint and fruit flavor compositions and the various flavor components together.

The addition of solvents and/or carriers (adsorbent or fine dispersion medium) to the flavor compositions and/or fragrance compositions gives ready-to-use flavors, which are usually added in this dilute form to foods, tobacco products and to products for oral care. These ready-to-use flavors can comprise additives and auxiliaries. Such additives and auxiliaries can be preservatives, dyes, antioxidants, flow agents, thickeners, emollients etc.

In the mint and/or fruit flavor compositions according to the present invention, the amount of 8-ocimenyl esters used is generally from 0.01 part by weight of 10 parts by weight, more preferably from 0.1 part by weight to 5 parts by weight.

The mint and/or fruit flavor compositions according to the present invention, and the ready-to-use flavors can be in liquid, semi-dried or in encapsulated form.

The spray-dried form is prepared from the liquid compositions by preparing an emulsion with the addition of specific amounts of a carrier, for example, biopolymers such as starch, maltodextrin and gum arabic. This emulsion is dried in spray driers by very fine dispersion with the simultaneous use of heat. This results in a powder having the desired loading of liquid flavor.

The encapsulated form is likewise prepared from the liquid compositions by adding a carrier. There are various technologies, which can be used to prepare flavor capsules.

The most common is extrusion, spray granulation and coacervation. The particle sizes usually range from 10 $\mu$m to 5 mm. The most common capsule materials are various starches, maltodextrin, gelatin. The liquid or solid flavor is enclosed in these capsules and can be released by a variety of mechanisms such as the application of heat, a shift in pH or the pressure of chewing.

Such flavors can be used throughout the entire food sector, tobacco products and in products for oral hygiene. In particular, they can be used for the flavoring of fatty products, bakery products, yogurt, ice cream, sweets, chewing gum, alcoholic and non-alcoholic beverages, tobacco, toothpaste and mouth washes. The concentration of such flavors is preferably from 0.0005 to 2% by weight, more preferably from 0.01 to 1% by weight, based on the finished foods, tobacco products or the oral hygiene products.

A principal use of the flavors according to the present invention is in sweets, chewing gum and products for oral hygiene (toothpaste, mouth washes). The mint flavors usually consist of peppermint oils (Mentha piperita), mentha-arvensis oils and/or spearmint oils (Mentha spicata and Mentha cardiaca) and fractions thereof with the addition of synthetic and natural flavor substances and other natural extracts or essential oils. These mint flavors impart a minty odor and taste to foods and oral hygiene compositions flavored therewith and ensure freshness in the mouth and of the breath. An important part of the taste profile of peppermint oil (Mentha piperita) are the sweet, hay-like notes (which some test subjects also referred to as tobacco notes), which are desired particularly for the flavoring of sweets and chewing gum. The taste profile of a pure peppermint oil in chewing gum is given below and confirms this statement.

Taste Profile of a Peppermint Oil (Mentha piperita) in Chewing Gum (Sugar-free, Concentration 1.2%)

| Flavor profile | Intensity (1–10) |
| --- | --- |
| impact | 6 |
| fullness | 8 |
| freshness | 6 |
| coolness | 6 |
| eucalyptus | 5 |
| menthol | 5 |
| menthone | 4 |
| green | 2 |
| spicy | 6 |
| tea | 8 |
| hay | 7 |
| camomile | 5 |
| floral | 4 |
| coumarin | 5 |

-continued

| Flavor profile | Intensity (1–10) |
|---|---|
| sweet | 7 |
| soft | 8 |
| earthy | 1 |
| mushroom-like | 1 |

Surprisingly, it has now been found that the mint flavors according to the present invention, as soon as they comprise the esters of 8-ocimenol (Ia)–(Id), can bring about markedly enhancing taste effects. Whilst the 8-ocimenyl esters (Ia)–(Id) in pure form have the above-described olfactory and gustatory properties "fresh, fruity, galbanum-like, green, pineapple, ester-like and floral", in mint compositions, they are able to significantly enhance the "sweet" and "hay" notes. In addition, it has time and again been established that test persons have found that the esters of the present invention "increases the gustatory impression of naturalness". A further finding is that said compounds are able to reduce bitter notes.

EXAMPLES

The invention was developed in systematic sensory experiments with the synthetic mint flavor compositions of the formula given below by way of example, into which the 8-ocimenylester (Ia)–(Id) were either added or omitted from the composition.

| | |
|---|---|
| 1-Menthol | 350 |
| Menthone/Isomenthone | 280 |
| 1-Menthyl acetate | 40 |
| Eucalyptol | 30 |
| Piperitone | 30 |
| Alpha-terpineol | 5 |
| Linalool | 5 |
| Myrtenyl acetate | 2 |
| Sabinene hydrate | 2 |
| Eugenol | 1 |
| Mint lactone | 1 |
| Cis-jasmone | 0.5 |
| Cis-3-hexenol | 0.3 |
| Dimethyl sulfide | 0.2 |
| 3-Octanol | 0.2 |
| Isovaleraldehyde | 0.2 |
| Alcohol, 96% v/v | 252.6 |
| Total | 1000 |

Replacing 0.1–1 g of the alcohol with 1 g of the ocimenyl esters (Ia)–(Id) resulted in a marked increase in the sensory impression of the "sweet" notes, and to an increase in the "naturalness".

The mint flavors were incorporated into sugar-containing and sugar-free chewing gum bases in concentrations customary in practice (1 to 1.5% by weight) and tasted after storage for approximately 4 weeks. A comparison of the mint flavors with and without 8-ocimenyl esters showed that the compounds in the flavors according to the present invention have an enhancing effect and, in particular, "enhance the sweetness, increase the naturalness of the flavor, enhance the hay notes, mask the menthol, have a rounding action, and help to mask the slight bitterness of the base". The sensory chewing experiments were carried out for 30 minutes.

The experiments with oral care products were carried out in toothpaste. In this experiment, use was made of both calcium carbonate and also silicate bases. The bases were sweetened with 0.2% of saccharin. Also, use was made of the synthetic mint flavors in which the 8-ocimenyl esters were added or omitted from the composition. A comparison of the mint flavors with and without the 8-ocimenyl esters showed that the mint flavors according to the present invention with the compounds have a flavor-enhancing effect and, in particular, enhance the impact, enhance the sweetness, increase the naturalness of the flavor, enhance the herbaceousness, mask the sharpness of the menthol, have a rounding effect, and help to mask the slight bitterness of the base.

This finding is of great importance particularly for chewing gum since, as is known, because of the chewing gum composition and also the menthol in mint compositions together with the long chewing time (sometimes more than half an hour), some test subjects reported bitter notes, which would preferably be suppressed by the mint flavors according to the present invention. In addition, it can be shown that the mint composition according to the present invention has a taste-prolonging action.

In summary, it can be established that the mint flavors according to the present invention in chewing gum have the following aroma-enhancing properties: they increase the sweet, hay notes increase the naturalness increase the impact reduce the bitterness prolong the peppermint taste, mask unpleasant aftertaste These properties were evident particularly between the $3^{rd}$ and $5^{th}$ minute of the chewing operation, during which, for about 3 minutes, the bitterness was reduced, the sweetness increased and, as a result, stimulation of the trigeminus nerve by the sharpness of the menthol was moderated.

In mint compositions for toothpaste, the flavor compositions according to the present invention have the following flavor-enhancing properties: they increase the naturalness increase the impact reduce the bitterness round off the menthol sharpness Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Mint flavor compositions comprising: A) 8-ocimenyl esters of the formula

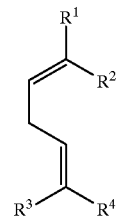

wherein one of the two radicals $R^1$ and $R^2$ is methyl and the other is vinyl and one of the two radicals $R^3$ and $R^4$ is methyl and the other is

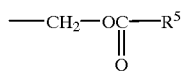

wherein
$R^5$ is hydrogen, alkyl or alkenyl; and B) mint flavor components.

2. Mint flavor compositions according to claim 1, wherein $R^5$ is $C_1$–$C_6$-alkyl or $C_2$–$C_6$-alkenyl.

3. Mint flavor compositions according to claim 1, wherein $R^5$ is hydrogen, methyl, ethyl, n-propyl, isopropyl, n-butyl, sec-butyl, iso-butyl, tert-butyl or 2-butenyl.

4. Mint flavor compositions according to claim 1, comprising 8-ocimenyl esters of the formulae (Ia)
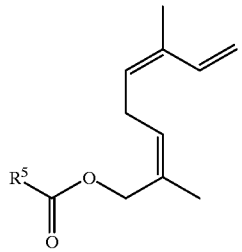

(Ib)
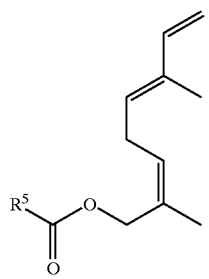

(Ic)
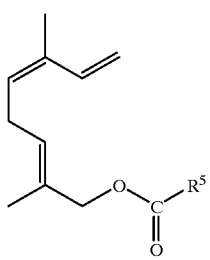

(Id)
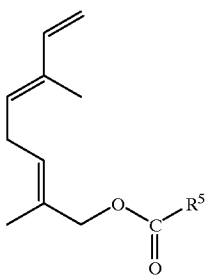

wherein
$R^5$ is hydrogen, methyl or ethyl.

5. Mint flavor compositions according to claim 1, comprising from 0.01 to 10% by weight of 8-ocimenyl esters based on said flavor composition.

6. Food products comprising flavor compositions comprising: A) 8-ocimenyl esters of the formula

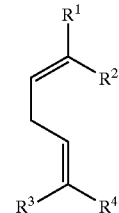

wherein one of the two radicals $R^1$ and $R^2$ is methyl and the other is vinyl and one of the two radicals $R^3$ and $R^4$ is methyl and the other is

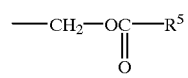

wherein
$R^5$ is hydrogen, alkyl or alkenyl;

and B) flavor components.

7. Food products according to claim 6, wherein $R^5$ is $C_1$–$C_6$-alkyl or $C_2$–$C_6$-alkenyl.

8. Food products according to claim 6, wherein $R^5$ is hydrogen, methyl, ethyl, n-propyl, isopropyl, n-butyl, sec-butyl, isobutyl, tert-butyl or 2-butenyl.

9. Food products according to claim 6, wherein said flavor composition comprises 8-ocimenyl esters of the formulae (Ia)
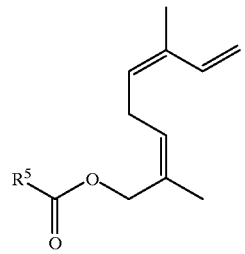

(Ib)
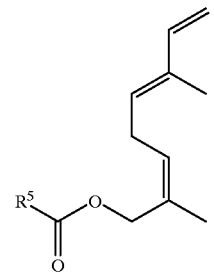

-continued

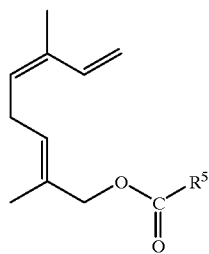
(Ic)

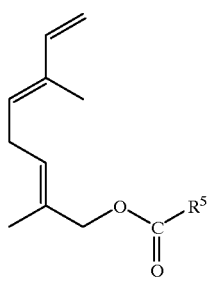
(Id)

wherein

R⁵ is hydrogen, methyl or ethyl.

10. Food products according to claim 6, comprising from 0.0005 to 2% by weight of said flavor composition based on said food product.

11. Food products according to claim 6, wherein said flavor composition is a mint flavor.

12. Food products according to claim 6, wherein said flavor composition is a fruit flavor.

13. Food products according to claim 6, wherein said flavor composition is a mint and fruit flavor.

14. Oral hygiene products comprising flavoring compositions comprising: A) 8-ocimenyl esters of the formula

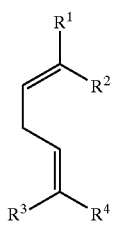

wherein one of the two radicals $R^1$ and $R^2$ is methyl and the other is vinyl and one of the two radicals $R^3$ and $R^4$ is methyl and the other is

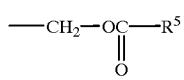

wherein $R^5$ is hydrogen, alkyl or alkenyl;

and B) mint flavor components.

15. Mint flavor compositions according to claim 1, wherein said mint flavor components are selected from the group consisting of: peppermint oils, spearmint oils, mentha-arvensis oils, oil of cloves, citrus oils, cinnamon bark oils, wintergreen oils, cassia oils, davana oils, spruce needle oils, eucalyptus oils, fennel oils, galbanum oils, ginger oils, camomile oils, caraway oils, rose oils, geranium oils, sage oils, yarrow oils, aniseed oils, thyme oils, juniper berry oils, angelica root oils, the fractions of these oils, menthol, menthone, isomenthone, menthyl acetate, menthofuran, mint lactone, eucalyptol, limonene, eugenol, pinene, sabinene hydrate, 3-octanol, carvone, gamma-octalactone, gamma-nonalactone, germacren-D, viridiflorol, 1,3E,5Z-undecatriene, isopulegol, piperitone, 3-octyl acetate, isoamyl isovalerate, hexanol, hexanal, cis-3-hexenol, linalool, alpha-terpineol, cis and trans carvyl acetate, p-cymene, damascenone, damascone, dimethyl sulfide, fenchol, cis-4-heptenal, isobutyraldehyde, isovaleraldehyde, cis-jasmone, anisaldehyde, methylsalicylate, myrtenyl acetate, 2-phenyl ethyl alcohol, 2-phenylethyl isobutyrate, 2-phenylethyl isovalerate, cinnamaldehyde, geraniol, nerol and mixtures thereof.

16. Fruit flavor compositions comprising: A) 8-ocimenyl esters of the formula

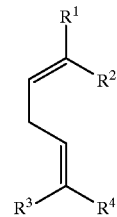

wherein one of the two radicals $R^1$ and $R^2$ is methyl and the other is vinyl and one of the two radicals $R^3$ and $R^4$ is methyl and the other is

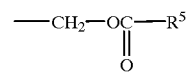

wherein $R^5$ is hydrogen, alkyl or alkenyl;

and B) fruit flavor components.

17. Fruit flavor compositions according to claim 16, wherein the fruit flavor components are selected from the group consisting of: citrus oils, buchu leaf oils, davana oils, cassia oils, cedarwood oils, geranium oils, grain fusel oils, lemongrass oils, ambrette oils, rose oils, cinnamon bark oils, oil of cloves, carrot seed oils, mace oils, massoi bark oils, sandalwood oils, the fractions of these oils, fruit juice concentrates from fruits, guarana extracts, elderflower extracts, iris absolute, broom absolute, jasmine absolute, liquorice extract, osmanthus absolute, iris root extract, vanilla extract, chicory extracts, cinnamon extracts, boronia absolute, distillates from fruits, saturated and unsaturated fruit esters from the lower aliphatic acids $C_1$–$C_{12}$ the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta-ionone, raspberry ketone, 2,5-dimethyl-4-hydroxy-3(2H)-furanone, limonene, linalool, linalool oxide, phenylacetaldehyde, phenylacetic acid, 2-phenylethanol, maltol, vanillin, eugenol, 2-methyl-4-propyl-1,3-oxathiane, 3-methylthiohexanol, 4-methyl-4-mercapto-2-pentanone, methyleugenol, anethole, anise alcohol, anisaldehyde, guaiacol, cinnamyl alcohol, cinnamaldehyde, citral, citronellal, citronellol, nerol, geraniol, ethylvanillin, benzyl alcohol, cinnamyl esters, benzyl esters, damascone, diacetyl, diethyl malonate, dihydrocoumarin, beta-7,8-dihydroionone, dimethyl anthranilate, methyl anthranilate, 2(5)-ethyl-5(2)-methyl-4-hydroxy-3(2H)-furanone, ethylmaltol, eucalyptol, farnesal, farnesol, heliotropin, cis-3-hexenyl esters, alpha-iron, menthol, menthyl acetate, ethyl decadienoate, methyl dihydrojasmonate, methyl cinnamate, ethyl cinnamate, methyl salicylate, lactic acid, myrcene, neryl acetate, geranyl acetate, nootkatone, 2,3-pentanedione, 2-alkanones, 3-thiohexanol, 8-thiomenthan-3-one, rose oxide, 4-ketoisophorone and mixtures thereof.

18. Fruit flavor compositions according to claim 16, wherein

R$^5$ is C$_1$–C$_6$-alkyl or C$_2$–C$_6$-alkenyl.

19. Fruit flavor compositions according to claim 16, wherein

R$^5$ is hydrogen, methyl, ethyl, n-propyl, isopropyl, n-butyl, sec-butyl, iso-butyl, tert-butyl or 2-butenyl.

20. Fruit flavor compositions according to claim 16, comprising 8-ocimenyl esters of the formulae

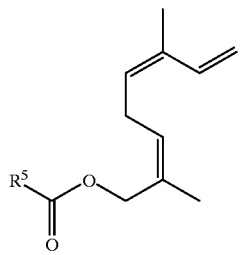

(Ia)

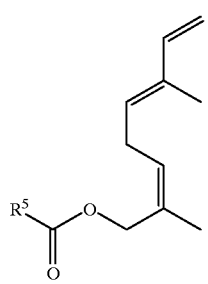

(Ib)

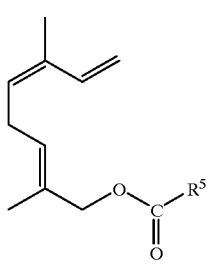

(Ic)

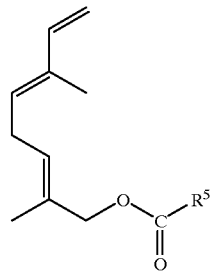

(Id)

wherein

R$^5$ is hydrogen, methyl or ethyl.

21. Fruit flavor compositions according to claim 16, comprising from 0.01 to 10% by weight of 8-ocimenyl esters based on said flavor composition.

22. Food products according to claim 11 wherein said mint flavor is selected from the group consisting of: peppermint oils, spearmint oils, mentha-arvensis oils, oil of cloves, citrus oils, cinnamon bark oils, wintergreen oils, cassia oils, davana oils, spruce needle oils, eucalyptus oils, fennel oils, galbanum oils, ginger oils, camomile oils, caraway oils, rose oils, geranium oils, sage oils, yarrow oils, aniseed oils, thyme oils, juniper berry oils, angelica root oils, the fractions of these oils, menthol, menthone, isomenthone, menthyl acetate, menthofuran, mint lactone, eucalyptol, limonene, eugenol, pinene, sabinene hydrate, 3-octanol, carvone, gamma-octalactone, gamma-nonalactone, germacren-D, viridiflorol, 1,3E,5Z-undecatriene, isopulegol, piperitone, 3-octyl acetate, isoamyl isovalerate, hexanol, hexanal, cis-3-hexenol, linalool, alpha-terpineol, cis and trans carvyl acetate, p-cymene, damascenone, damascone, dimethyl sulfide, fenchol, cis-4-heptenal, isobutyraldehyde, isovaleraldehyde, cis-jasmone, anisaldehyde, methylsalicylate, myrtenyl acetate, 2-phenyl ethyl alcohol, 2-phenylethyl isobutyrate, 2-phenylethyl isovalerate, cinnamaldehyde, geraniol, nerol and mixtures thereof.

23. Foods products according to claim 12, wherein said fruit flavor is selected from the group consisting of: citrus oils, buchu leaf oils, davana oils, cassia oils, cedarwood oils, geranium oils, grain fusel oils, lemongrass oils, ambrette oils, rose oils, cinnamon bark oils, oil of cloves, carrot seed oils, mace oils, massoi bark oils, sandalwood oils, the fractions of these oils, fruit juice concentrates from fruits, guarana extracts, elderflower extracts, iris absolute, broom absolute, jasmine absolute, liquorice extract, osmanthus absolute, iris root extract, vanilla extract, chicory extracts, cinnamon extracts, boronia absolute, distillates from fruits, saturated and unsaturated fruit esters from the lower aliphatic acids C$_1$–C$_{12}$ and the lower alcohols C$_1$–C$_{12}$, the aliphatic saturated and unsaturated acids C$_1$–C$_{14}$, the aliphatic saturated and unsaturated alcohols C$_3$–C$_{14}$, the aliphatic saturated and unsaturated aldehydes C$_2$–C$_{14}$, the saturated and unsaturated gamma-lactones C$_5$–C$_{14}$, damascenone, alpha-ionone, beta-ionone, raspberry ketone, 2,5-dimethyl-4-hydroxy-3(2H)-furanone, limonene, linalool, linalool oxide, phenylacetaldehyde, phenylacetic acid, 2-phenylethanol, maltol, vanillin, eugenol, 2-methyl-4-propyl-1,3-oxathiane, 3-methylthiohexanol, 4-methyl-4-mercapto-2-pentanone, methyleugenol, anethole, anise alcohol, anisaldehyde, guaiacol, cinnamyl alcohol, cinnamaldehyde, citral, citronellal, citronellol, nerol, geraniol, ethylvanillin, benzyl alcohol, cinnamyl esters, benzyl esters, damascone, diacetyl, diethyl malonate, dihydrocoumarin, beta-7,8-dihydroionone, dimethyl anthranilate, methyl anthranilate, 2(5)-ethyl-5(2)-methyl-4-hydroxy-3(2H)-furanone, ethylmaltol, eucalyptol, farnesal, farnesol, heliotropin, cis-3-hexenyl esters, alpha-iron, menthol, menthyl acetate, ethyl decadienoate, methyl dihydrojasmonate, methyl cinnamate, ethyl cinnamate, methyl salicylate, lactic acid, myrcene, neryl acetate, geranyl acetate, nootkatone, 2,3-pentanedione, 2-alkanones, 3-thiohexanol, 8-thiomenthan-3-one, rose oxide, 4-ketoisophorone and mixtures thereof.

24. Oral hygiene products according to claim 14, wherein said flavor components comprise mint flavors.

25. Oral hygiene products according to claim 24, wherein said mint flavors are selected from the group consisting of: peppermint oils, spearmint oils, mentha-arvensis oils, oil of cloves, citrus oils, cinnamon bark oils, wintergreen oils, cassia oils, davana oils, spruce needle oils, eucalyptus oils, fennel oils, galbanum oils, ginger oils, camomile oils, caraway oils, rose oils, geranium oils, sage oils, yarrow oils, aniseed oils, thyme oils, juniper berry oils, angelica root oils, the fractions of these oils, menthol, menthone, isomenthone, menthyl acetate, menthofuran, mint lactone, eucalyptol, limonene, eugenol, pinene, sabinene hydrate, 3-octanol, carvone, gamma-octalactone, gamma-nonalactone, germacren-D, viridiflorol, 1,3E,5Z-undecatriene, isopulegol, piperitone, 3-octyl acetate, isoamyl isovalerate, hexanol, hexanal, cis-3-hexenol, linalool, alpha-terpineol, cis and trans carvyl acetate, p-cymene, damascenone, damascone, dimethyl sulfide, fenchol, cis-4-heptenal, isobutyraldehyde, isovaleraldehyde, cis-jasmone, anisaldehyde, methylsalicylate, myrtenyl acetate, 2-phenyl ethyl alcohol, 2-phenylethyl isobutyrate, 2-phenylethyl isovalerate, cinnamaldehyde, geraniol, nerol and mixtures thereof.

26. Oral hygiene products according to claim 14, wherein said flavor components comprises fruit flavors.

27. Oral hygiene products according to claim 26, wherein said fruit flavors are selected from the group consisting of: citrus oils, buchu leaf oils, davana oils, cassia oils, cedarwood oils, geranium oils, grain fusel oils, lemongrass oils, ambrette oils, rose oils, cinnamon bark oils, oil of cloves, carrot seed oils, mace oils, massoi bark oils, sandalwood oils, the fractions of these oils, fruit juice concentrates from fruits, guarana extracts, elderflower extracts, iris absolute, broom absolute, jasmine absolute, liquorice extract, osmanthus absolute, iris root extract, vanilla extract, chicory extracts, cinnamon extracts, boronia absolute, distillates from fruits, saturated and unsaturated fruit esters from the lower aliphatic acids $C_1$–$C_{12}$ and the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta-ionone, raspberry ketone, 2,5-dimethyl-4-hydroxy-3(2H)-furanone, limonene, linalool, linalool oxide, phenylacetaldehyde, phenylacetic acid, 2-phenylethanol, maltol, vanillin, eugenol, 2-methyl-4-propyl-1,3-oxathiane, 3-methylthiohexanol, 4-methyl-4-mercapto-2-pentanone, methyleugenol, anethole, anise alcohol, anisaldehyde, guaiacol, cinnamyl alcohol, cinnamaldehyde, citral, citronellal, citronellol, nerol, geraniol, ethylvanillin, benzyl alcohol, cinnamyl esters, benzyl esters, damascone, diacetyl, diethyl malonate, dihydrocoumarin, beta-7,8-dihydroionone, dimethyl anthranilate, methyl anthranilate, 2(5)-ethyl-5(2)-methyl-4-hydroxy-3(2H)-furanone, ethylmaltol, eucalyptol, farnesal, farnesol, heliotropin, cis-3-hexenyl esters, alpha-iron, menthol, menthyl acetate, ethyl decadienoate, methyl dihydrojasmonate, methyl cinnamate, ethyl cinnamate, methyl salicylate, lactic acid, myrcene, neryl acetate, geranyl acetate, nootkatone, 2,3-pentanedione, 2-alkanones, 3-thiohexanol, 8-thiomenthan-3-one, rose oxide 4-ketoisophorone and mixtures thereof.

* * * * *